Jan. 4, 1966    T. E. HASTY    3,227,944
APPARATUS FOR DETECTING ANGULAR DEVIATIONS
Filed Sept. 25, 1962    3 Sheets-Sheet 1

Turner E. Hasty
INVENTOR

BY *John D. Stroham*
ATTORNEY

Turner E. Hasty
INVENTOR

BY John D. Graham
ATTORNEY

United States Patent Office 3,227,944
Patented Jan. 4, 1966

3,227,944
APPARATUS FOR DETECTING ANGULAR DEVIATIONS
Turner E. Hasty, Dallas, Tex., assignor to Texas Instruments Incorporated, Dallas, Tex., a corporation of Delaware
Filed Sept. 25, 1962, Ser. No. 226,058
3 Claims. (Cl. 324—.5)

The present invention relates primarily to an apparatus for detecting angular deviations. More specifically, it is capable of detecting extremely small angular deviations with great sensitivity by sensing a small magnetic field and is useful in any apparatus requiring the detection of these quantities such as, for example, a seismometer.

There are numerous areas, seismology for example, where is is advantageous to precisely detect very small angular deviations with great sensitivity and precision. In the detection of these angular deviations it is to be understood that the apparatus performing the detection finds utility not only in determining the absolute magnitude of the angular deviations in radians, but finds equal utility as a null device. Thus, when the apparatus is used in the latter application, infinitesimal angular deviations from the null conditions are detected and subsequently the null condition is restored without the actual determination of the absolute magnitude of the angular deviation itself. On the other hand, the output of the apparatus is merely calibrated if the absolute magnitude is desired.

In providing an apparatus or device having the above-described properties, it is apparent that small physical size, simplicity, durability and portability of the apparatus become important considerations, especially in the field of seismology where all of these features are desirable.

It is therefore an object of this invention to provide an apparatus for detecting angular deviations with great precision and sensitivity.

Another object is to provide an apparatus for detecting extremely small angular deviations with great sensitivity.

Yet another object is to provide an apparatus having utility as a null indicator of great sensitivity for extremely small angular deviations.

Still another object is to provide an apparatus of the type described that has the characteristics of small physical size, simplicity of design, durability and portability.

Another object is to provide an apparatus for detecting very small magnetic fields with great sensitivity.

Other objects, features and advantages of the present invention will become apparent from the following description of the preferred embodiment when taken in connection with the appended claims and the attached drawing in which like reference numerals refer to like parts throughout the several figures, and in which:

FIG. 6b is the associated circuitry used to provide a readout and visual display of the output from the device of FIG. 6a.

Figure 1A:
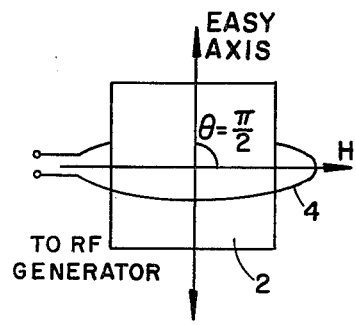
FIG. 1a illustrates a ferromagnetic film having a uniaxial anisotropy characteristic in the presence of an external magnetic field applied in the plane of the film perpendicular to the easy axis thereof, and a radio-frequency coil for generating an R.F. magnetic field parallel with the easy axis.

The device of the invention includes a thin ferromagnetic film having the property of uniaxial anisotropy and has as its mode of operation the dependence of the Larmor precession frequency of the magnetization vector on the angle between an externally applied magnetic field and the easy axis of the film. The ferromagnetic film is suspended along an axis slightly less than perpendicular to its easy axis, say about 89°, and an external magnetic field is applied to the film for determining small angular deviations of the magnetic film as it rotates about the axis of suspension. In the preferred embodiment, the external magnetic field applied comprises both an applied alternating magnetic field parallel to the axis of suspension, and a relatively large magnitude steady magnetic field applied in a plane perpendicular to the axis of suspension. A sensing coil is provided about the magnetic film and is connected to a radio-frequency generator such that the R.F. magnetic field produced thereby is perpendicular to the axis of suspension. By adjusting the frequency of the R.F. generator to the proper value, the angle of rotation of the magnetic film about the axis of suspension can be determined in terms of the voltage drop across the R.F. generator.

This is, in essence, a resonance device, in that a resonance condition is established when the frequency of the R.F. sensing coil and the Larmor precession frequency of the magnetization vector are equal to each other. The great sensitivity of the device, which goes to the essence of the invention, results from the fact that the frequency of the R.F. sensing coil is maintained at a very low level, say about 1 megacycle per second, so that a resonance condition is not established until the precession frequency of the magnetization vector is forced to decrease from its originally high level in the case of no externally applied magnetic field, say about 600 megacycles per second, to he very low level of resonance, viz. 1 mc./sec., the latter frequency representing the application of a relatively large externally applied magnetic field substantially perpendicular to the easy axis of the film. A contrast is seen in that 600 mc./sec., is in the ultra-high frequency range whereas 1 mc./sec. is in the radio-frequency range. In fact, at 1 mc./sec., the precession frequency of the magnetization vector of the film is approaching a null condition.

In order to adequately describe the invention, it will be helpful to briefly describe the ferromagnetic film under discussion and some properties associated therewith. It is well-known, for example, to produce ferromagnetic films by vacuum evaporation techniques that exhibit the property of uniaxial anisotropy in the plane of the film, wherein this anisotropy can be expressed as one magnetic field directed along the preferred axis of the film. The preferred axis is known as the easy axis and the magnetic field is known as the anisotropy field and will hereinafter be designated as $H_k$. Associated with the film is what is known as the magnetization vector which possesses both an angular momentum and a magnetic moment. A discussion of this vector and its associated characteristics is given in the article by Turner E. Hasty and Lee J. Boudreaux, Journal of Applied Physics, vol. 32, No. 10, pp. 18–7–1810, October 1961. It is also well-known that the magnetization vector will precess at a frequency known as the Larmor precession frequency when a magnetic field is applied to the film and this precession occurs about the magnetic field applied. That is to say, the magnetization vector precesses about the applied magnetic field vector such that its average value is directed along the applied magnetic field. In the absence of an external magnetic field applied to the ferromagnetic film, the magnetization vector will still precess since there exists in the film an internal field which is due to the anisotropy field and the demagnetizing field. This frequency of precession is given by the expression $$\omega = \gamma \sqrt{4\pi M H_k}$$

where $\omega$ is the frequency of precession,
$\gamma$ is the gyromagnetic ratio and is equal to 2.8 mc./gauss,
$H_k$ is the anisotropy field, and
$M$ is the magnetization vector magnitude.

As an example, this particular precession frequency for an alloy film comprised of about 80% nickel-20% iron is about 600 mc./sec.

Figure 1B:
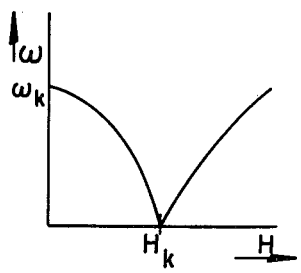
FIGS. 1b and 1c are graphical illustrations of physical effects caused by the application of the external magnetic field.
Figure 1C:
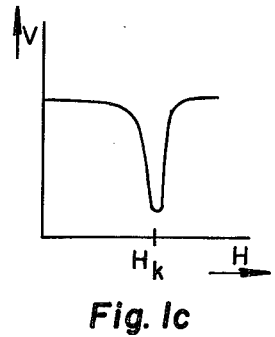

Referring now to FIG. 1a, there is shown an illustration of a ferromagnetic film 2 lying in the plane of the drawing having the property of uniaxial anisotropy designated by the easy axis. Also shown in an external magnetic field H applied perpendicular to the easy axis. In addition a sensing coil 4, which is part of an R.F. resonance circuit (shown in FIG. 6b) connected to an R.F. generator encircles the film 2 to produce an R.F. magnetic field in the plane of the film and parallel to the easy axis. If the magnitude of the magnetic field H is increased from zero to $H_k$, the latter being the anisotropy field, the frequency of precession of the magnetization vector decreases from an initial value designated by $\omega_k$ to zero as the external magnetic field magnitude approaches the magnitude of $H_k$, as shown in FIG. 1b. The initial precession frequency of the magnetization vector without an external magnetic field applied is a result of the internal field of the film as above described. As the magnitude of the external field is increased beyond $H_k$, the precession frequency increases from zero. By applying a sensing R.F. magnetic field along the easy axis of the film as indicated by the coil 4 where the frequency of the R.F. generator is maintained at a very small magnitude, a resonance absorption will be detected when the precession frequency of the magnetization vector approaches the frequency of the R.F. magnetic field. This detection can be observed as a voltage drop across the R.F. generator when the resonance absorption occurs, which is equivalent to saying that energy is being absorbed from the generator. There is shown in FIG. 1c an illustration of the voltage across the generator versus the magnitude of the magnetic field applied to the film, and a minimum voltage is indicated when the magnetic field H is equal to $H_k$, the anisotropy field. As an illustrative example, an alloy film of 80% nickel-20% iron having uniaxial anisotropy has a magnetization vector whose precession frequency is about 600 mc./sec. in the absence of an external magnetic field. In order to sense the above effect a frequency of about 1 mc./sec. is applied to the R.F. sensing coil. Thus, the detection of the resonance condition occurs when the external field applied approaches the magnitude of $H_k$ to such a degree that the precession frequency approaches 1 mc./sec.

Figure 2A:
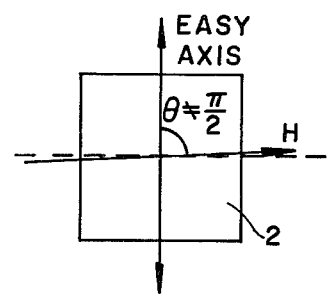
FIGS. 2a–2c are similar illustrations for a slightly different set of conditions than shown in the previous figures.
Figure 2B:
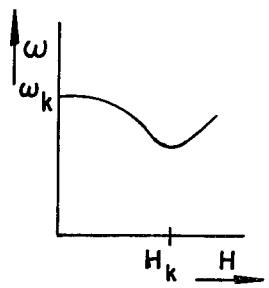
Figure 2C:
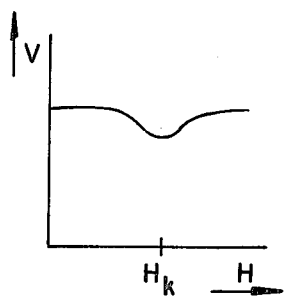
Figure 3A:
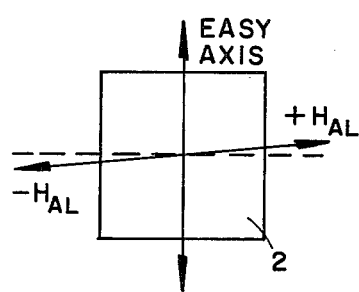
FIGS. 3a and 3b are illustrations for a third set of conditions.
Figure 3B:
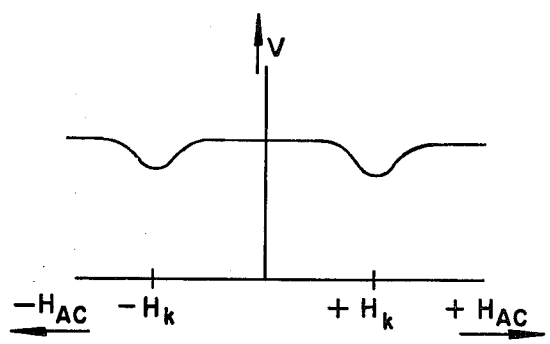

Referring now to FIG. 2a there is shown the same ferromagnetic film 2 but with an external magnetic field H applied in the plane of the film at an angle slightly less than perpendicular to the easy axis. As the magnitude of the field H is increased from zero the precession frequency of the magnetization vector decreases, but does not decrease to zero as the magnitude of the field H approaches the magnitude of $H_k$. This is illustrated in FIG. 2b by the use of a sensing coil similar to that of FIG. 1a. In addition, a voltage drop occurs across the R.F. generator as the precession frequency of the magnetization vector approaches the frequency of the sensing coil. This is illustrated in FIG. 2c. It will also be noted that the amount of energy absorbed from the sensing coil as the precession frequency approaches the sensing coil frequency is reduced and is not as great as for the conditions set forth in FIG. 1c. FIGS. 3a and 3b illustrate the effect when an alternating external magnetic field $H_{AC}$ is applied to the film at an angle very slightly less than 90° from the easy axis. By displaying the voltage of the sensing coil on an oscilloscope versus the magnitude of the alternating field, a minimum voltage will be displayed both when the alternating field reaches the plus $H_k$ and a minus $H_k$, thus indicating that the energy absorption effect (called resonance condition) occurs in either direction.

Figure 4A:
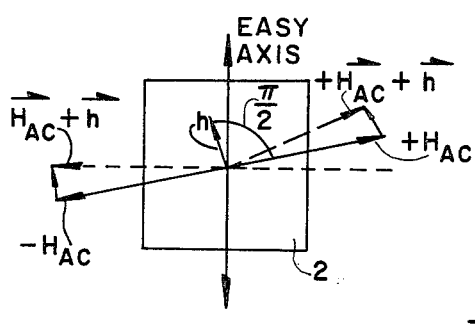
FIGS. 4a and 4b are illustrations for a fourth set of conditions.
Figure 4B:
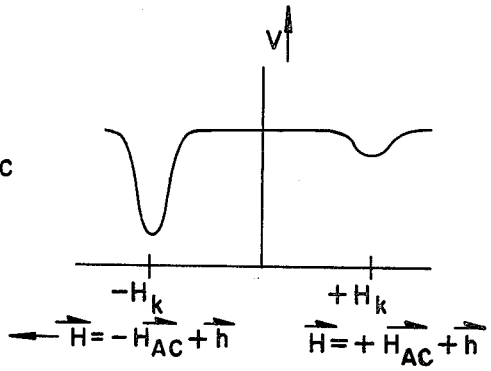

Referring now to FIG. 4a there is shown the ferromagnetic film 2 with two external magnetic fields applied in the plane of the film. The first of these fields is the alternating field previously described and is designated by $H_{AC}$, whereas the second is steady-state, is one of very small magnitude and is applied perpendicular to the alternating magnetic field and designated by $h$. Again the alternating field is applied at an angle very nearly equal to but slightly less than 90° from the easy axis of the film. From what has been said, the direction of the small magnetic field $h$ is almost parallel with the easy axis. As the alternating magnetic field magnitude increases from zero to its amplitude in a positive direction the resultant external magnetic field applied to the film will be the vector addition of the magnitude of the alternating field and the magnitude of the small steady field $h$, this being designated by $+H_{AC}+h$ in FIG. 4a. Assuming for the present that the magnitude of the alternating field has increased to a value sufficient that the resulting magnetic field is equal in magnitude to the anisotrophy field $H_k$, it will be noted from FIG. 4a that the resulting field at this point will have a direction lying between the direction of the alternating field and the easy axis. On the other hand, when the alternating field increases from zero in the negative direction the vector addition of the magnitude of the alternating field and the small steady field $h$ produces a resultant magnetic field having a direction very nearly perpendicular to the easy axis of the film. A sensing coil connected to a R.F. generator and utilized in the same manner as described with reference to FIG. 1a will indicate a voltage drop across the generator substantially as shown in FIG. 4b. Thus as the alternating magnetic field magnitude approaches that required to produce a resultant magnetic field equal to the anisotropy field $H_k$ a small drop in voltage across the R.F. generator is observed if the alternating field increased in a positive direction according to the connection of the figure. The voltage drop is very slight since the resultant magnetic field externally applied does not have a direction perpendicular to the easy axis of the film. By the same token, as the alternating magnetic field increases in the negative direction and approaches a magnitude sufficient to produce a resultant magnetic field equal to the magnitude of the anisotropy field $H_k$, a very large voltage drop across the R.F. generator is observed, since the resultant field has a direction that is very nearly perpendicular to the easy axis. It is to be noted that the various magnitudes of the externally applied fields can be adjusted such that the resultant magnetic field lies exactly perpendicular to the easy axis, thus giving a maximum voltage drop across the R.F. generator. Moreover, it is not necessary that the resulting magnetic field at the amplitude of the alternating field be exactly equal in magnitude to $H_k$. However, if it is less than $H_k$, sensitivity in detection will be sacrificed, whereas if it is equal to or greater than $H_k$, the optimum condition will have been achieved.

By utilizing the effects described in the foregoing, a device for measuring small ambient magnetic fields is provided. Instead of using a known steady magnetic field $h$, the film can be placed in an ambient magnetic field, and the component of the field perpendicular to the externally applied field $H_{AC}$ can be determined by merely calibrating the oscilloscope or some other suitable instrument.

Figure 5A:
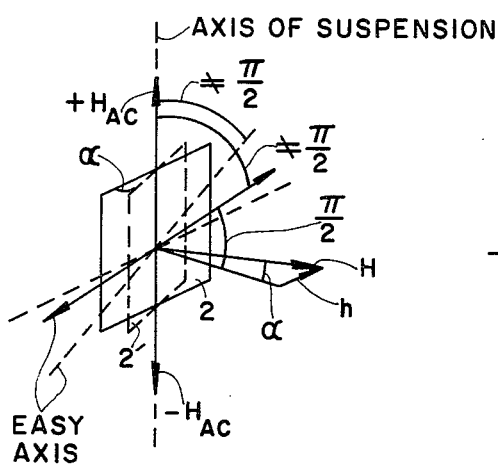
FIGS. 5a and 5b are respectively a pictorial and a top view of a thin ferromagnetic film after being deviated through a small angle along an axis perpendicular to the easy axis.

The apparatus described in the foregoing has utility as a magnetometer and also aids in an understanding of the preferred embodiment of the invention which will now be described in detail with reference to FIGS. 5a, 5b, 6a and 6b. Referring specifically to FIG. 5a there is shown the ferromagnetic film 2 suspended along a vertical axis with the easy axis of the film being slightly less than perpendicular to the axis of suspension, say at about 89°. In this figure the film is shown in two orientations where the film was initially in a position indicated by 2' shown by dotted lines and in a subsequent position which is merely rotated about the axis of suspension by a slight angle α, designated by 2 and shown by the solid lines. A steady external magnetic field H is applied perpendicular to the plane of the film in the intial condition 2'. In addition, an alternating field $H_{AC}$ is applied along and parallel to the suspension axis. A sensing coil (not shown) is placed about the film so as to produce an R.F. sensing field perpendicular to the suspension axis. This condition will not effect the frequency of precession of the magnetization vector whatsoever and consequently no detection of a resonant absorption will be observed. As the ferromagnetic film is rotated a small angle α about the axis of suspension to its new position 2, it will be noted that the externally applied magnetic field H now makes an angle α with the perpendicular to the plane of the film and thus can now be resolved into two perpendicular components, one which is perpendicular to the plane of the film in its new orientation and the other that is both parallel to this plane and perpendicular to $H_{AC}$. The latter component is designated as $h$ and makes a small angle with the easy axis. This is more clearly illustrated in FIG. 5b which shows the film lying in the plane of the drawing. Under the new condition as designated by 2, absorption of energy by the sensing coil will occur when the alternating field attains a magnitude sufficient to reduce the precession frequency of the magnetization vector and cause it to approach the frequency of the sensing coil.

Figure 5B:
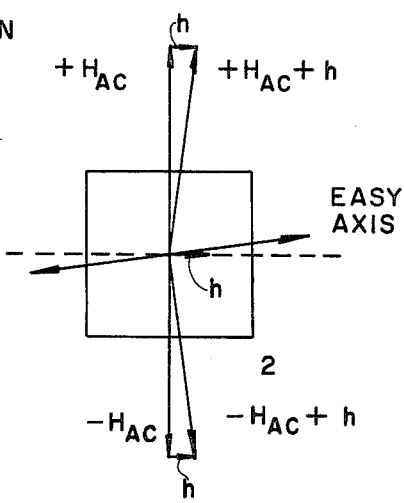

It will now be apparent that there is an advantage in using a large magnitude, steady magnetic field H applied perpendicular to the plane of the film in its original position to produce the small steady field $h$, since greater accuracy and control over H is readily achieved. It will also be observed that a loss of sensitivity of detection results if the alternating field $H_{AC}$ is applied exactly perpendicular to the easy axis and the small field is applied exactly parallel to the easy axis. In connection with this, there would be no way to determine in which direction the film rotated, unless these external fields are shifted in direction by a small angle, as indicated in FIG. 5b. However, under the conditions shown in FIGS. 5a and 5b, a large drop in voltage across the R.F. oscillator occurs during one-half cycle of the alternating field $H_{AC}$, whereas a very small voltage drop occurs during the other half-cycle, thus permitting calibration as to direction of rotation. Of course, the alternating field also serves as a modulation source as its magnitude varies so that a peak voltage can be displayed. Finally, by knowing the value of H and the amplitude of $H_{AC}$, the device can be calibrated in terms of angle of deviation as a function of voltage drop across the R.F. generator.

Figure 6A:
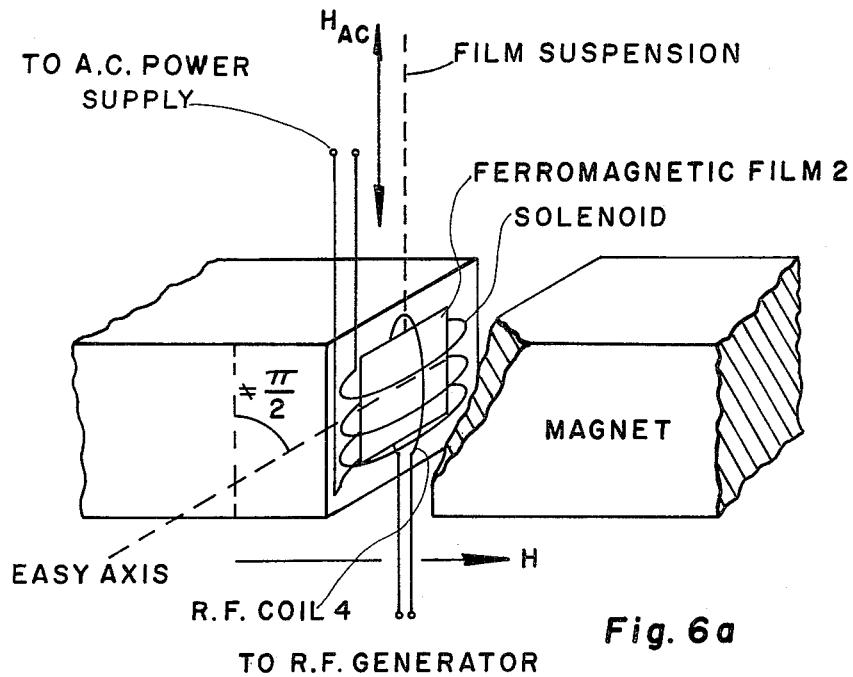
FIG. 6a is an illustration of the apparatus used as a device for detecting small angular deviations.

A pictorial view of an illustrative device and apparatus of the invention is shown in FIG. 6a wherein the film is suspended between the pole faces of a permanent magnet. A suitable coil or solenoid is provided about the film to produce an alternating field $H_{AC}$ parallel to the axis of suspension, and a sensing coil 4 is also provided about the film. The ferromagnetic film 2 can be comprised of any ferromagnetic material exhibiting uniaxial anisotropy. The suspension can be a flexible member such as a torsion fiber or can be a rigid member fixed to the film. In the latter case the apparatus may be oriented in any manner or direction in space while maintaining the same relative direction among the components comprising the device.

Figure 6B:
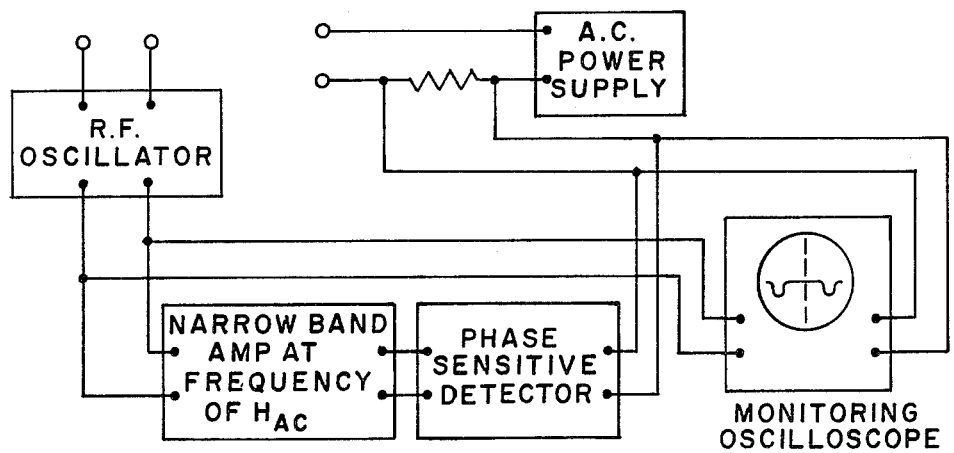

Shown in FIG. 6b is the associated apparatus for supplying power to generate the external alternating magnetic fields and for providing an electronic and/or visual readout. An R.F. generator supplies energy to the coil 4 and a low frequency alternating current generator (much less than the radio-frequency range) supplies energy to generate the alternating field $H_{AC}$. In order to visually display the output on a monitoring oscilloscope the output of the R.F. generator is applied to the vertical plates of the oscilloscope and the voltage drop across a series resistor in the alternating current circuit is applied to the horizontal plates to provide a proper phase and a time base proportional to the magnitude of $H_{AC}$. Alternatively, a narrow band amplifier for amplifying the frequency of $H_{AC}$ can be used to amplify the output and a phase sensitive detector can be used to detect the output from the amplifier. The resultant output can be recorded, for example, on a suitable recorder. The electronic apparatus is shown as an example of suitable power sources and readout equipment, but it is understood that it forms no part of the invention and is used for illustrative purposes only.

As one example of actual performance an alloy film of about 80% nickel-20% iron, having the property of uniaxial anisotropy and of dimensions 2 mm.×2 mm. ×10⁻⁴ mm. (dimensions not critical) was rotatably suspended along a direction of 89° from the easy axis between the pole faces of a permanent magnet H of intensity of 5000 gauss. By knowing the characteristics of the ferromagnetic film, $H_k$ being about 4 gauss, and applying an alternating field of amplitude of 6 gauss, a magnetic field $h$ as small as $10^{-4}$ gauss has been detected, that being the component of H lying in the plane of the film when the film is rotated about its axis of suspension. From geometrical calculation from the equation $h = H \sin \beta$ where $\beta$ equals the angle of rotation, this small field $h$ represents an angle of $2 \times 10^{-8}$ radians. Thus it will be appreciated that the device possesses great sensitivity for the purpose of detecting and measuring both extremely small magnitude magnetic fields and angles of deviation.

Although the invention has been described with reference to a specific embodiment, it is understood that modifications and substitutions can be made without departing from the scope thereof as defined by the appended claims.

What is claimed is:

1. Apparatus for detecting small angular deviations of a ferromagnetic film, comprising
   (a) a ferromagnetic film having the property of uniaxial anisotropy with an easy axis of magnetization whose magnetization vector has a Larmor frequency of precession at least in the ultra-high frequency range in the absence of any externally applied magnetic field,
   (b) means for suspending said film about an axis of rotation, said axis being in the plane of said film and substantially perpendicular to said easy axis,
   (c) means for applying a steady magnetic field substantially perpendicular to said axis of rotation such that a component of said steady field lies in the plane of said film substantially parallel to said easy axis and the magnitude of said component increases from zero as a function of the angle of rotation of the plane of said film from a position perpendicular to said steady field,
   (d) a first coil positioned in the vicinity of said film for applying a radio frequency magnetic field to said film substantially perpendicular to both said axis of rotation and said steady magnetic field, and (e) a second coil positioned in the vicinity of said film for applying a low frequency magnetic field to said film substantially parallel with said axis of rotation for reducing said precession frequency to the radio frequency range, (f) whereby energy is absorbed from said first coil by said film when said precession frequency approaches the radio frequency of said first coil as the film is rotated from a reference position, and (g) means for detecting and indicating the absorption of radio frequency energy from said first coil to provide a measure of the angle of rotation of said film from said reference position.

2. Apparatus for detecting small angular deviations of a ferromagnetic film, comprising (a) a ferromagnetic film having the property of uniaxial anisotropy with an easy axis of magnetization whose magnetization vector has a Larmor frequency of precession at least in the ultra-high frequency range in the absence of any externally applied magnetic field, (b) said film being suspended for rotation about an axis in the plane of said film and substantially perpendicular to said easy axis, (c) means for applying a steady magnetic field substantially perpendicular to said axis of rotation such that a component of said steady field lies in the plane of said film substantially parallel to said easy axis and the magnitude of said component increases from zero as a function of the angle of rotation of the plane of said film from a position perpendicular to said steady field, (d) first means positioned in the vicinity of said film for applying a radio frequency magnetic field to said film substantially perpendicular to both said axis of rotation and said steady magnetic field, and (e) second means positioned in the vicinity of said film for applying a low frequency magnetic field to said film substantially parallel with said axis of rotation for reducing said precession frequency to the radio frequency range, (f) whereby energy is absorbed from said first means by said film when said precession frequency approaches the radio frequency of said first means as the film is rotated from a reference position, and (g) means for detecting and indicating the absorption of radio frequency energy from said first means to provide a measure of the angle of rotation of said film from said reference position.

3. Apparatus according to claim 2 wherein the axis of rotation of the film is substantially perpendicular to the easy axis of the film but is displaced from the perpendicular position by a small angle so that upon application of said low frequency magnetic field the absorption of radio frequency energy is much greater when the instantaneous direction of said low frequency magnetic field is in one direction than when such field is in the other direction.

References Cited by the Examiner

UNITED STATES PATENTS 3,113,263  12/1963  Collins _____ 324—0.5

OTHER REFERENCES

Bickford, Physical Review, vol. 78, No. 4, May 1950, pp. 449 to 457.

Brown et al.: Physical Review, vol. 98, No. 2, April 15, 1955, pp. 442 to 448.

Damon, Reviews of Modern Physics, vol. 25, No. 1, January 1953, pp. 239 to 245.

Dillon et al.: The Review of Scientific Instruments, vol. 30, No. 7, July 1959, pp. 559 to 561.

Hasty et al: Journal of Applied Physics, vol. 32, No. 10, October 1961, pp. 1807 to 1810.

Tannenwald et al: Physical Review, vol. 105, No. 2, Jan. 15, 1957, pp. 337 and 378.

Volkoff et al: Canadian Journal of Physics, vol. 30, No. 3, 1952, pp. 270 to 289.

CHESTER L. JUSTUS, *Primary Examiner.*

MAYNARD R. WILBUR, *Examiner.*